(12) United States Patent
Schaap

(10) Patent No.: US 7,599,317 B2
(45) Date of Patent: Oct. 6, 2009

(54) METHOD AND APPARATUS FOR PREDICTION OF A CONNECTION IDENTIFIER IN A DOWNLINK BURST

(75) Inventor: Wim Schaap, Kortenhoef (NL)

(73) Assignee: Motorola, Inc., Schaumburg, IL (US)

( * ) Notice: Subject to any disclaimer, the term of this patent is extended or adjusted under 35 U.S.C. 154(b) by 465 days.

(21) Appl. No.: 11/404,359

(22) Filed: Apr. 14, 2006

(65) Prior Publication Data

US 2007/0242635 A1  Oct. 18, 2007

(51) Int. Cl.
   *H04W 8/00* (2009.01)
(52) U.S. Cl. ............... 370/310; 370/328; 370/338; 370/349; 370/278
(58) Field of Classification Search ............... 370/310, 370/328, 338, 428, 473, 278, 277, 282, 349; 714/748; 709/230
See application file for complete search history.

(56) References Cited

U.S. PATENT DOCUMENTS

| | | | |
|---|---|---|---|
| 7,020,822 B2 * | 3/2006 | Ho et al. ............... | 714/748 |
| 2003/0079169 A1 * | 4/2003 | Ho et al. ............... | 714/748 |
| 2004/0053601 A1 | 3/2004 | Frank et al. | |
| 2005/0025182 A1 | 2/2005 | Nazari | |
| 2005/0059347 A1 | 3/2005 | Haartsen | |
| 2005/0286407 A1 * | 12/2005 | Park et al. ............... | 370/208 |
| 2006/0018268 A1 * | 1/2006 | Kakani et al. ............ | 370/278 |
| 2007/0160083 A1 * | 7/2007 | Un et al. ................. | 370/470 |
| 2007/0242686 A1 * | 10/2007 | Zegers et al. ............ | 370/428 |

FOREIGN PATENT DOCUMENTS

WO  2006000094 A1  1/2006

OTHER PUBLICATIONS

International Search Report PCT/US07/64555 dated Mar. 20, 2008.

* cited by examiner

*Primary Examiner*—Kamran Afshar
(74) *Attorney, Agent, or Firm*—Ingrassia, Fisher & Lorenz, P.C.

(57) ABSTRACT

An apparatus for processing a downlink frame is provided which includes receiver circuitry (324), a physical layer processor (346) coupled to the receiver circuitry (324) and a MAC layer processor (348) coupled to the physical layer processor (346) is provided. The receiver circuitry (324) receives radio frequency (RF) signals and demodulates the RF signals to recover the downlink frame. The physical layer processor (346) processes the downlink frame to recover a plurality of MPDUs (704), each MPDU (500) including a CID (508). And the MAC layer processor (348) receives one of the plurality of MPDUs (806, 810) from the physical layer processor (346), processes it to recover its CID (812), and determines in response to the CID whether to process a next one of the MPDUs or whether to cease processing of the MPDUs (816).

10 Claims, 7 Drawing Sheets

METHOD AND APPARATUS FOR PREDICTION OF A CONNECTION IDENTIFIER IN A DOWNLINK BURST

FIELD OF THE INVENTION

The present invention generally relates to packet-based communication systems which pass the packets through a Medium Access Control (MAC) layer before processing the information contained therein, and more particularly relates to a method and apparatus for prediction of a connection identifier (CID) within a downlink frame by a mobile station processing at a MAC layer.

BACKGROUND OF THE INVENTION

The Open System Interconnection (OSI) model defines a networking framework for implementing protocols in seven hierarchy layers. Control is submitted from one layer and delivered to the next layer through Service Access Points (SAPs), starting at the Application layer in one station and proceeding to the bottom layer or Physical layer. The seven layers are: an Application layer, a Presentation layer, a Session layer, a Transport layer, a Network layer, a Data Link layer, and a Physical layer. A Media Access Control (MAC) layer is a sub-layer of the Data Link layer and provides information to and/or receives information from the Physical layer, such as demodulated and decoded packets from downlink receiver circuitry. For example, in burst-mode wireless communications, at the uplink side, the MAC layer submits information to a Physical layer in the form of MAC Protocol Data Units (MPDUs) with a generic MAC header (GMH) containing a Connection Identifier (CID). The downlink Physical layer at the base station arranges the MPDUs for encoding into downlink bursts and arranging the downlink bursts into downlink frames for transmission from a transmitter.

The IEEE 802.16 standard provides an Air Interface specification for fixed broadband wireless communication systems which passes MPDUs through a MAC layer. At downlink reception, since not all MPDUs in a downlink burst are intended for the mobile station, the MAC layer examines the CID of each MPDU in the downlink burst to determine whether the MPDU is intended for reception by the mobile station. Examination of all of the MPDUs requires substantial unnecessary processing time by the MAC processor.

Thus, what is needed is a method and apparatus for a MAC processor to predict which CIDs in a downlink frame are intended for the mobile station so that unintended MPDUs need not be processed. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

A method for encoding a downlink frame for packet-based wireless communications includes the step of ordering a plurality of Media Access Control (MAC) layer protocol data units (MPDUs) within the downlink frame in response to a connection identifier (CID) of each of the plurality of MPDUs. The downlink frame includes a plurality of MPDUs, each MPDU including a CID.

An apparatus for processing a downlink frame includes receiver circuitry, a physical layer processor coupled to the receiver circuitry and a MAC layer processor coupled to the physical layer processor. The receiver circuitry receives radio frequency (RF) signals and demodulates the RF signals to recover the downlink frame. The physical layer processor processes the downlink frame to recover a plurality of MPDUs, each MPDU including a CID. And the MAC layer processor receives one of the plurality of MPDUs from the physical layer processor, processes it to recover its CID, and determines in response to the CID whether to process a next one of the MPDUs or whether to cease processing of the MPDUs.

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
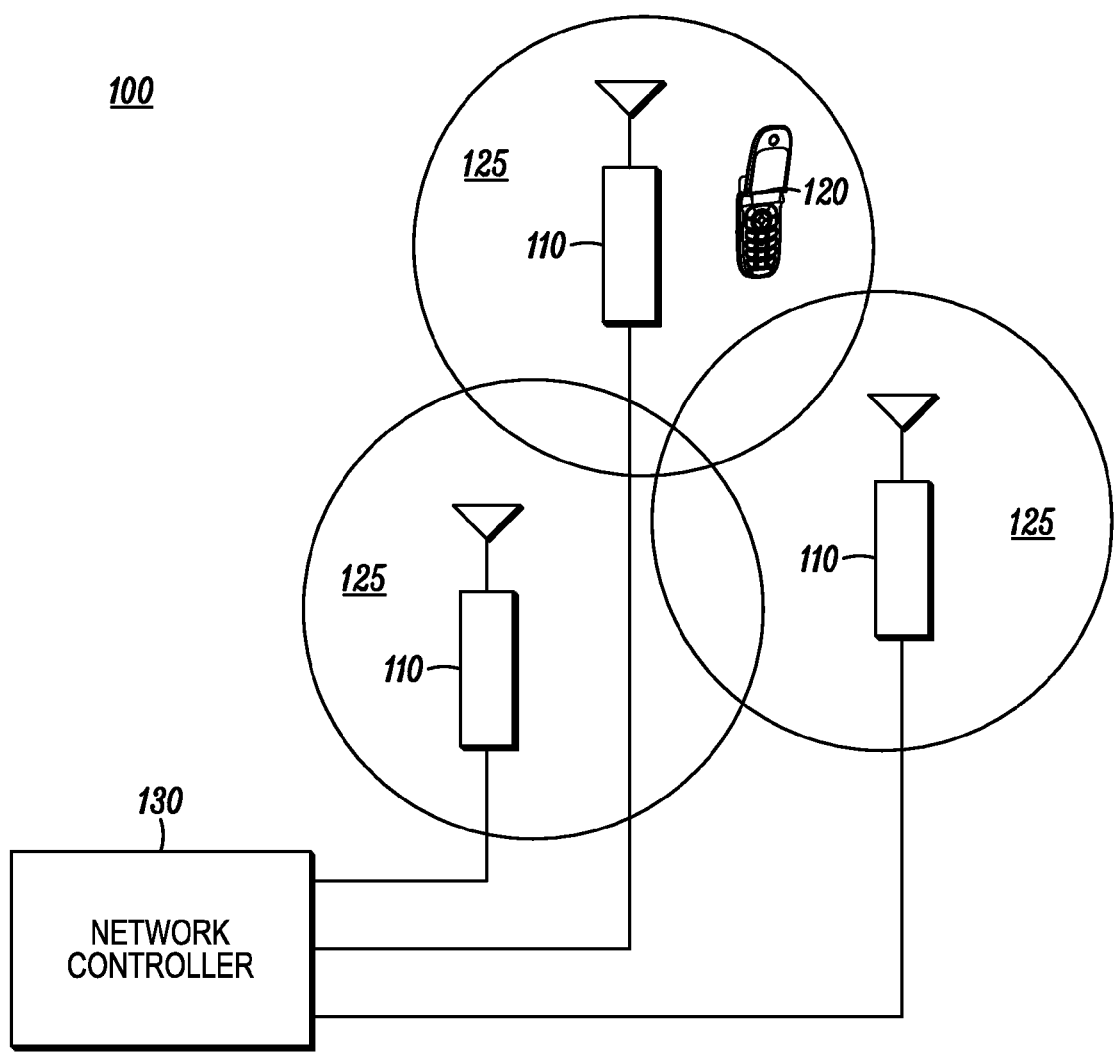
FIG. 1 is a diagram of a wireless communication system in accordance with an embodiment of the present invention.

Referring to FIG. 1, a wireless communication system 100 in accordance with an embodiment of the present invention includes a plurality of base stations 110 communicating with a mobile station 120 via radio frequency (RF) signals. Associated with each of the plurality of base stations 110 is a coverage area 125 wherein the mobile station 120 can receive RF signals from and transmit RF signals to one or more of the plurality of base stations 110. The plurality of base stations 110 are coupled to a network system controller 130 for centralized control of the wireless communication system. Packet-based wireless communication systems, such some wide-area code division multiple access (WCDMA) wireless communication systems or, more particularly orthogonal frequency domain multiple access (OFDMA) wireless communication systems transmit information for mobile stations 120 in downlink bursts.

Figure 2:
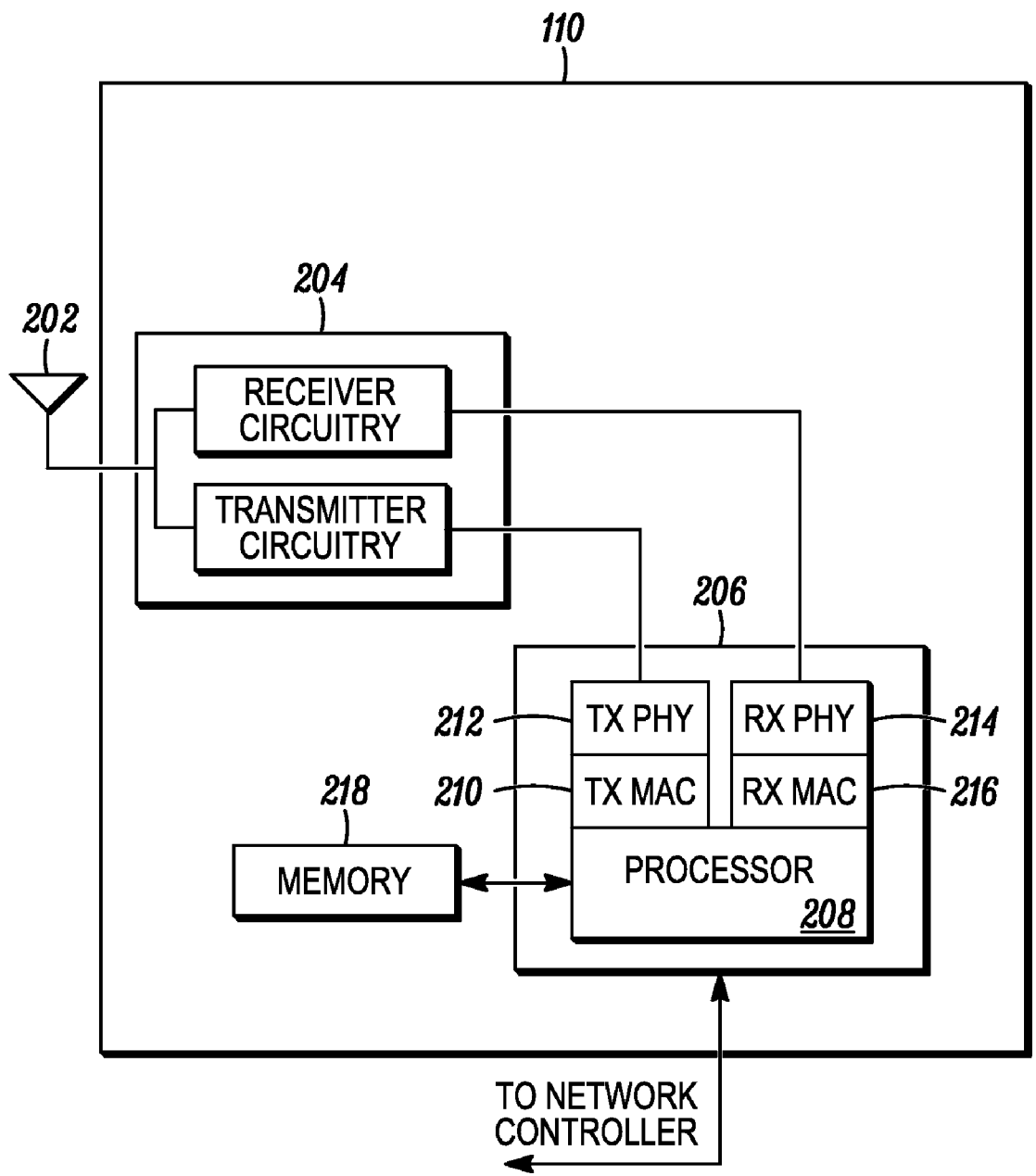
FIG. 2 is a block diagram of a base station of the wireless communication system of FIG. 1 in accordance with the embodiment of the present invention.

Referring to FIG. 2, a base station 110 in accordance with the embodiment of the present invention includes an antenna 202 coupled to transceiver circuitry 204 for transmitting RF signals comprising encoded and modulated data. The transceiver circuitry 204 is coupled to a controller 206. The controller 206 includes a processor 208 which submits information to a MAC layer encoder 210 coupled to a Physical layer encoder 212, the Physical layer encoder 212 providing signals to the antenna 202 for downlink transmission to the mobile station 120. For uplink communications, the antenna 202 is coupled to a Physical layer 214 coupled to a MAC layer 216 for deciphering the information provided thereto and submitting that information to the processor 208. A memory device 218 is also provided in a typical manner for storing code and data necessary for the operation of the base station 110.

Figure 3:
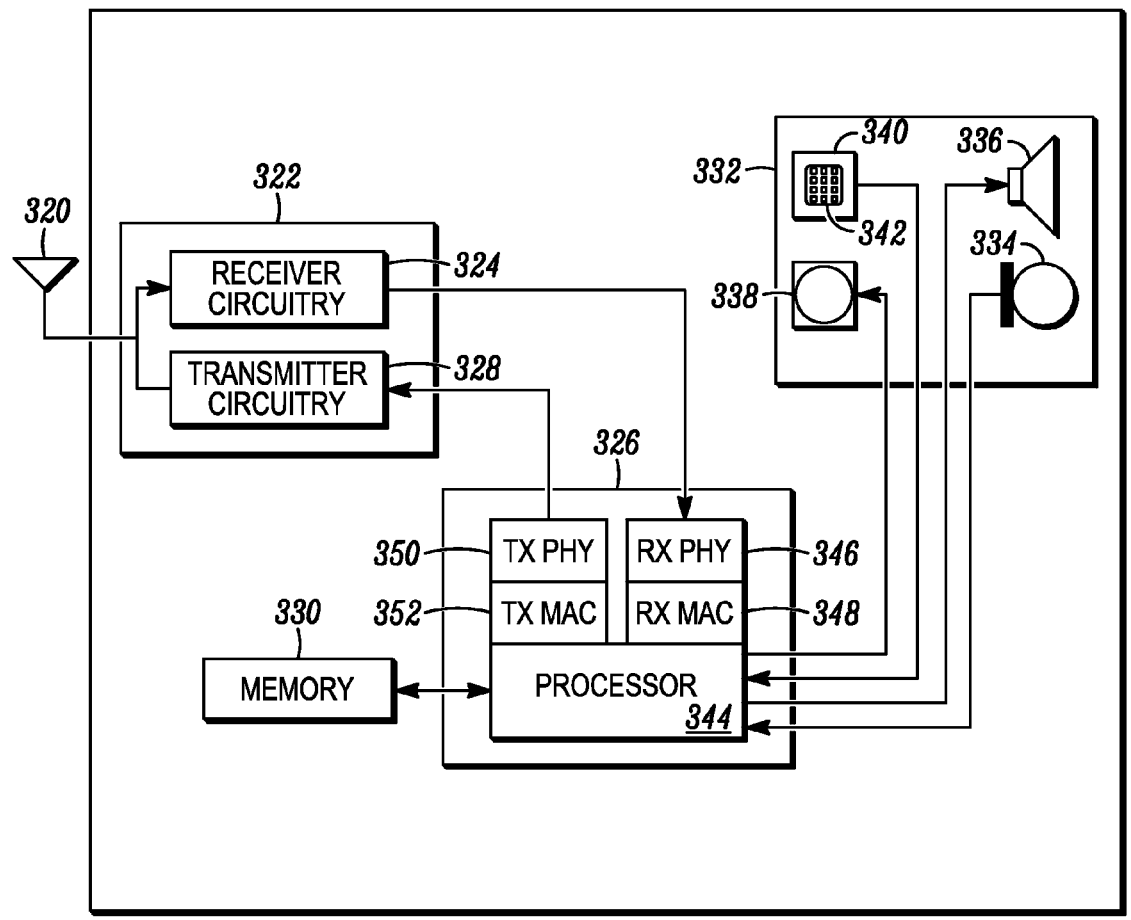
FIG. 3 is a block diagram of a mobile station of the wireless communication system of FIG. 1 in accordance with the embodiment of the present invention.

Referring to FIG. 3, the mobile station 120, such as a cellular telephone, includes an antenna 320 for receiving and transmitting radio frequency (RF) signals. Transceiver circuitry 322 includes receiver circuitry 324 which demodulates and decodes RF signals received from the base station 110 to derive information therefrom and is coupled to a controller 326 for providing the decoded information thereto for utilization thereby in accordance with the function(s) of the mobile station 120. The controller 326 also provides information to transmitter circuitry 328 of the transceiver circuitry 322 for encoding and modulating information into RF signals for transmission from the antenna 320.

As is well-known in the art, the controller 326 is typically coupled to a memory device 330 and a user interface 332 to perform the functions of the mobile station 120. The user interface 332 includes a microphone 334, a speaker 336 and a display 338 which may be designed to accept touch screen inputs. The user interface 332 also includes one or more key inputs 340, including a keypad 342. In accordance with the present invention, the controller 326 includes a processor 344, a downlink Physical layer processor (RX PHY) 346, a downlink MAC layer processor (RX MAC) 348, an uplink Physical layer processor (TX PHY) 350, and an uplink MAC layer processor (TX MAC) 352.

Figure 4:
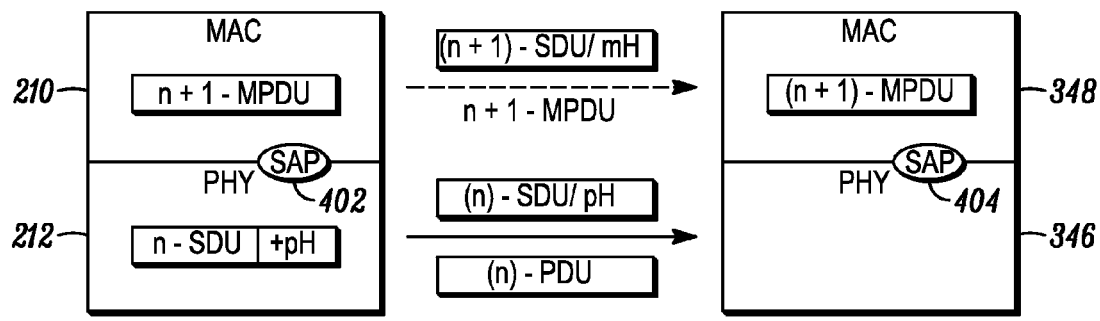
FIG. 4 is a diagram of communication across layers of an Open System Interconnection (OSI) network.

Referring next to FIG. 4, a diagram of communication across layers of an Open System Interconnection (OSI) network is shown. The OSI network is a framework for implementing protocols in seven hierarchy layers. Control is submitted from one layer and delivered to the next layer through Service Access Points (SAPs), starting at the Application layer in one station and proceeding to the bottom layer or Physical layer. The seven layers are: an Application layer, a Presentation layer, a Session layer, a Transport layer, a Network layer, a Data Link layer, and a Physical layer. A Media Access Control (MAC) layer is a sub-layer of the Data Link layer and provides information to and/or receives information from the Physical layer, such as demodulated and decoded packets from downlink receiver circuitry.

In OSI networks, layer n+1 entities make use of layer n services via a Service Access Point (SAP). FIG. 4 depicts downlink communication from a base station MAC layer (layer n+1) encoder 210 to a Physical layer (layer n) encoder 212 via a first SAP 402. As shown, (n+1) MAC protocol data units (MPDUs) are submitted by the MAC layer encoder 210 to the (n)SAP 402 and transitions to a n-service data unit (SDU) within the Physical layer encoder 212. PDUs are communicated between peer layers (e.g., MPDUs are communicated between 'transmitter' MAC encoder 210 and 'receiver' MAC processor 348, or PDUs are communicated between 'transmitter' PHY encoder 212 and 'receiver' PHY processor 346). Thus, the n-SDU delivered to the Physical layer encoder 212 has a physical layer header (pH) added thereto and is transmitted downlink to the physical (PHY) processor 346. The n-PDU received by the PHY processor 346 is passed to the MAC processor 348 via a second SAP 404 and an (n+1)-MPDU is generated therefrom.

Figure 5:
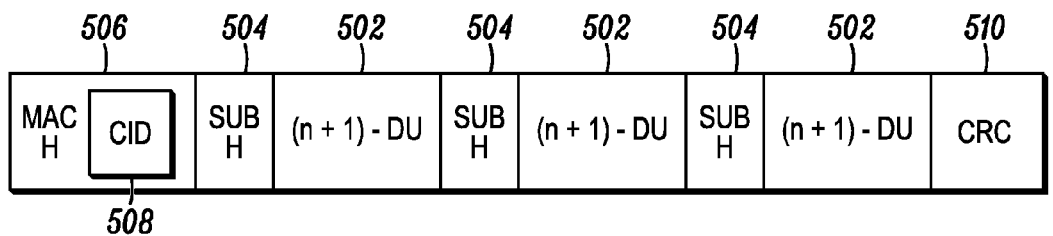
FIG. 5 is a diagram of the structure of a MAC Protocol Data Unit (MPDU) in accordance with the embodiment of the present invention.

Referring to FIG. 5, a structure of an MPDU 500 in accordance with an embodiment of the present invention is shown. One or more fragments 502 are generated from an MSDU received from the next layer by splitting the information of the MSDU into the one or more fragments. The MPDU 500 includes one or more fragments 502 and each fragment includes a sub-Header 504. The sub-Header 504 includes for each fragment (a) fragment number information, such as FSN, (b) fragmentation control information, such as FC, and (c) the length of the fragment 502. The fragment number information is sequentially assigned to the fragments 502 as they are created. Fragmentation control information is assigned to each of the fragments in response to whether the fragment is a first fragment, a continuing fragment or a last fragment of the MSDU from which the fragment was generated (i.e., split) or whether the MSDU is unfragmented ("U"), i.e., the MSDU is not split.

In accordance with the present invention, a MAC header 506 includes a connection identifier (CID) 508 identifying a connection and/or the nature of the connection (where the nature of the connection can be, for example, a management connection, a transport connection or a broadcast connection). The MAC header 506 also includes additional information for processing the. MPDU, such as encryption control and key sequence information, header type and header check sequence information, and information on the length of the MPDU. The MAC Header 506 also includes a bit to indicate whether cyclic redundancy check information 510 is present. When present, the cyclic redundancy check information 510 is utilized to verify whether an MPDU is correctly received.

Figure 6:
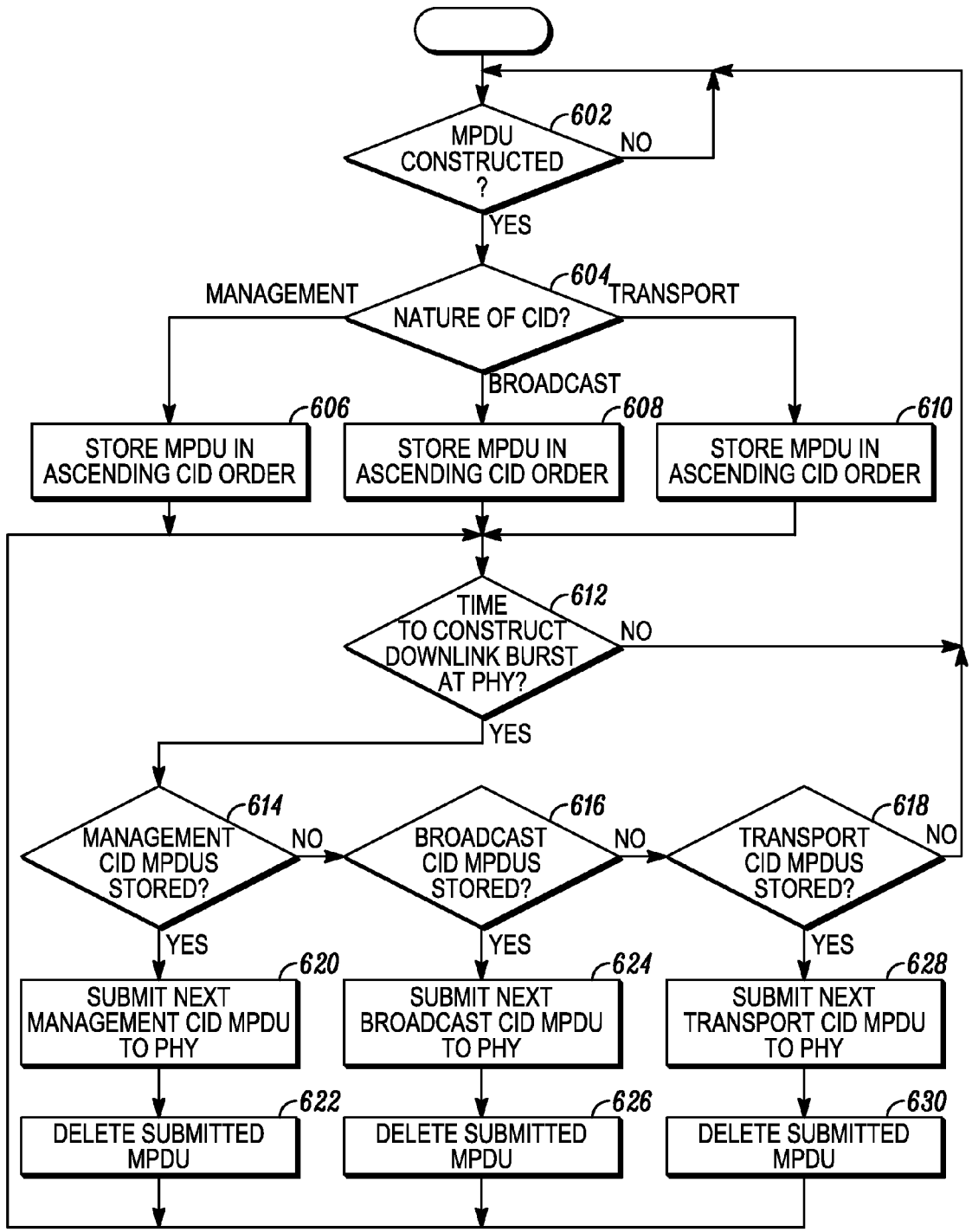
FIG. 6 is a flowchart of the operation of the MAC layer encoder of the base station of FIG. 2 in accordance with the embodiment of the present invention.

Referring to FIG. 6, a flowchart of the operation of the MAC layer encoder 210 in accordance with the present invention begins by awaiting construction of a MPDU 602 from another functional block of the MAC layer encoder 210. When a MPDU is constructed 602, the nature of the CID of the MPDU is determined 604. If the CID is a management CID 604, the MPDU is stored with other management CID MPDU ordered in ascending CID order 606. If the CID is a broadcast CID 604, the MPDU is stored with other broadcast CID MPDU ordered in ascending CID order 608. If the CID is a transport CID 604, the MPDU is stored with other transport CID MPDU ordered in ascending CID order 610.

After the MPDU is ordered and stored 606, 608, 610, processing next determines if it is time for construction of a downlink burst 612 at the physical layer encoder 212. If a downlink burst is not being constructed 612 at the physical layer encoder 212, processing returns to await reception of the next constructed MPDU 602. When a downlink burst is being constructed 612 at the physical layer encoder 212, processing determines whether there are any management CID MPDUs stored 614, any broadcast CID MPDUs stored 616, or any transport CID MPDUs stored 618. If there are no stored MPDUs 614, 616, 618, processing returns to await reception of the next constructed MPDU 602.

When management CID MPDUs are stored 614, the next management CID MPDU is submitted 620 to the physical layer encoder 212 and the submitted MPDU is deleted 622. When broadcast CID MPDUs are stored 616, the next broadcast CID MPDU is submitted 624 to the physical layer encoder 212 and the submitted MPDU is deleted 626. When transport CID MPDUs are stored 618, the next transport CID MPDU is submitted 628 to the physical layer encoder 212 and the submitted MPDU is deleted 630. After the submitted MPDU is deleted 622, 626, 630, processing returns to determine if the physical layer encoder 212 is still constructing a downlink burst 612.

Thus, it can be seen that in accordance with the embodiment of the present invention, the physical layer encoder 212 constructs downlink bursts with MPDUs ordered first in response to the nature of the CID and then, within each nature of CID category, ordered in ascending CID order. After the downlink burst is constructed, it is added to a downlink frame for provision to the transmitter circuitry of the transceiver circuitry 204 for encoding and modulation thereby and transmission therefrom. Alternatively, the MPDUs may be ordered in accordance with descending CIDs.

Figure 7:
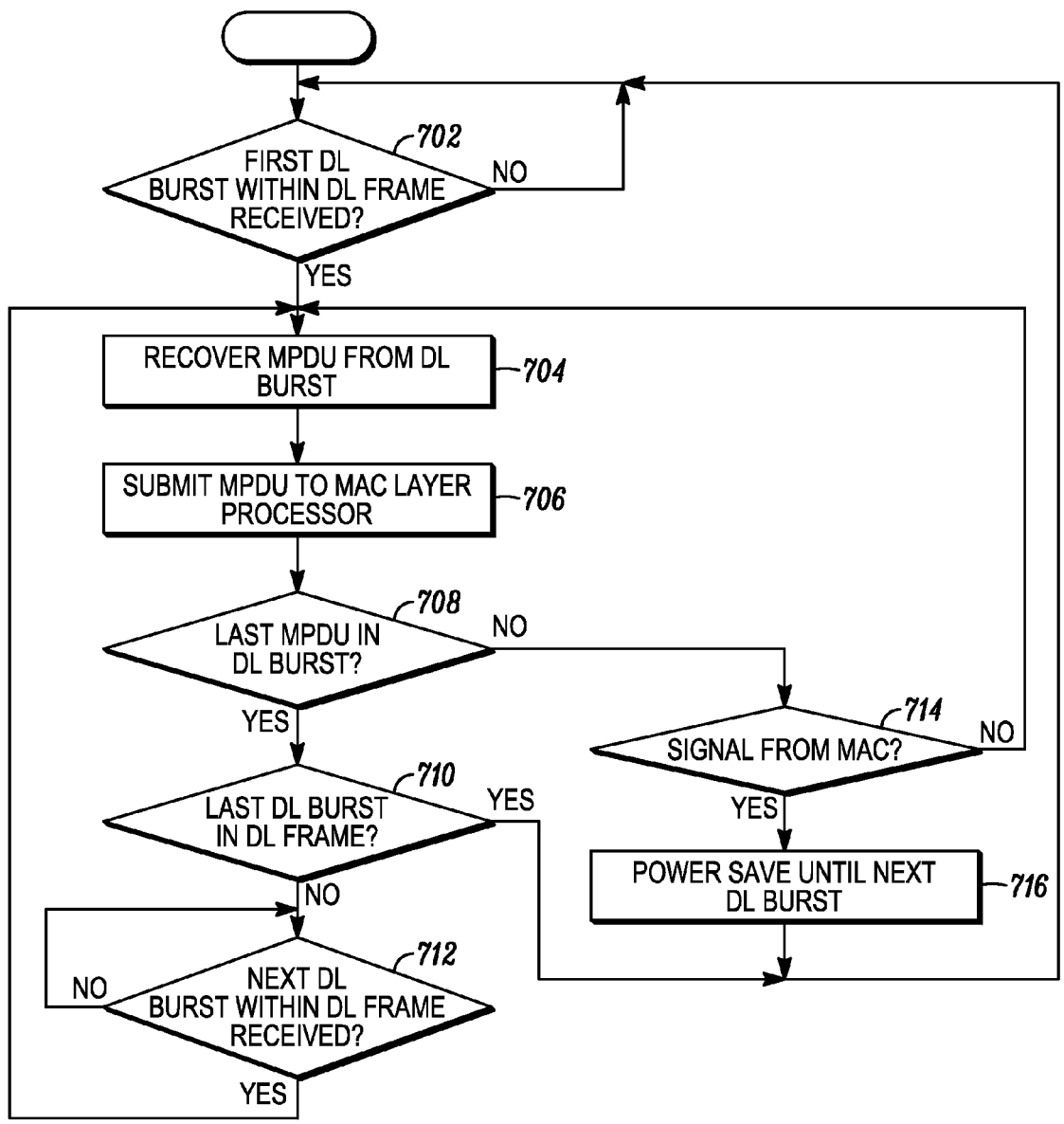
FIG. 7 is a flowchart of the operation of the Physical layer processor of the mobile station of FIG. 3 in accordance with the embodiment of the present invention.

Referring to FIG. 7, a flowchart of the downlink frame processing of the physical layer processor 346 in accordance with the present invention initially awaits reception of a first downlink burst within the downlink frame 702. When the first downlink burst is received 702, an MPDU is recovered from the downlink burst 704 and submitted 706 to the MAC layer processor 348. If the MPDU recovered 704 and submitted 706 is the last MPDU in the downlink burst 708, it is next determined if the downlink burst is the last downlink burst in the downlink frame 710. If the received downlink burst is the last downlink burst in the downlink frame 710, processing returns to await the first downlink burst of the next downlink frame 702. If the received downlink burst is not the last downlink burst in the downlink frame 710, processing awaits reception of the next downlink burst 712 and, when the next downlink burst is received 712, processing returns to recover an MPDU from the downlink burst 704.

If the MPDU recovered 704 and submitted 706 is not the last MPDU in the downlink burst, it is next determined in accordance with the embodiment of the present invention whether a signal has been received 714 from the MAC layer processor 348 indicating that no further MPDUs are relevant to the mobile station 120. If no such signal is received 714, processing returns to recover the next MPDU from the downlink burst 704. If a signal indicating no further relevant MPDUs is received 714, processing drops the rest of the downlink burst and power saves 716 until the next downlink burst is received 702.

Figure 8:
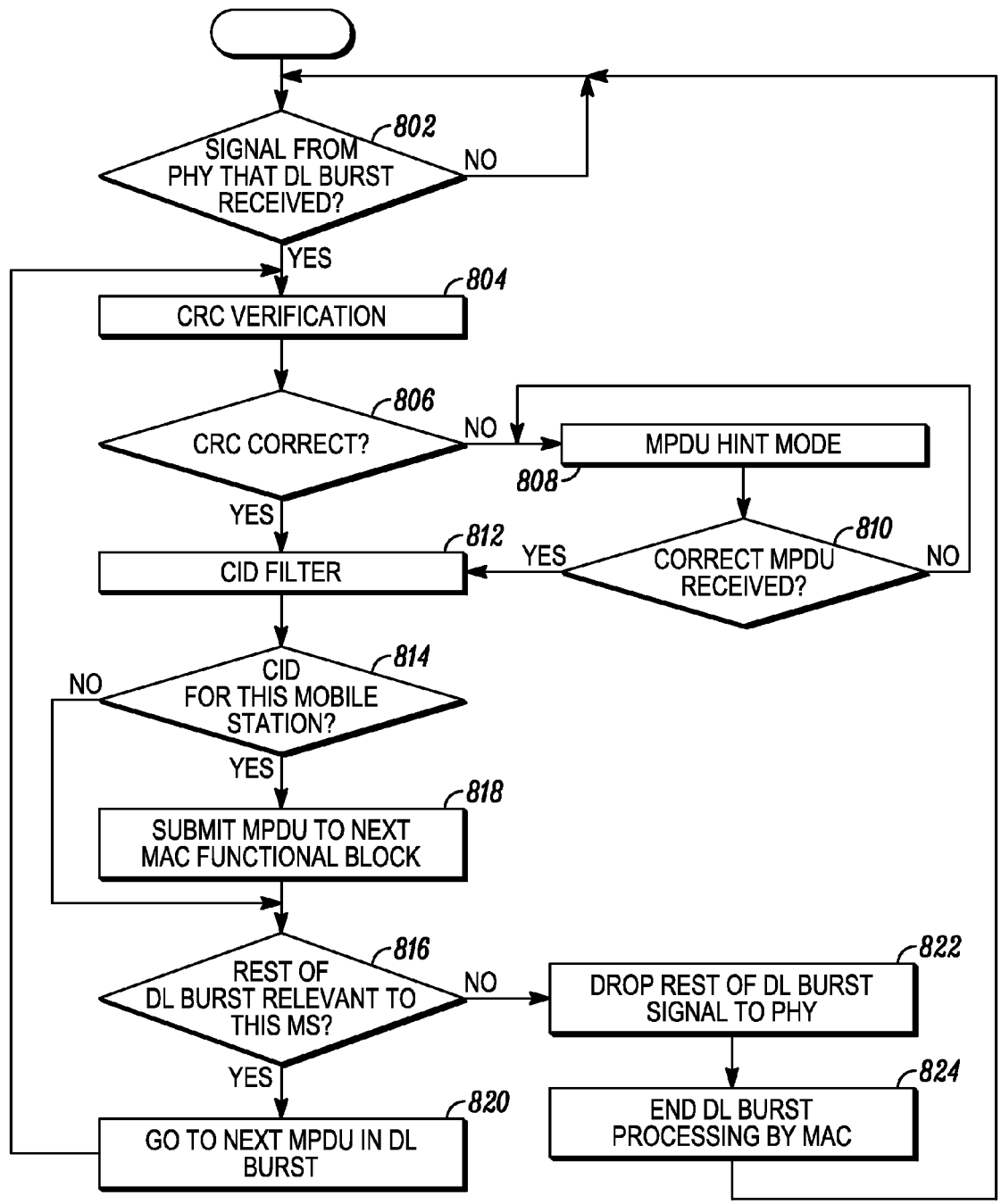
FIG. 8 is a flowchart of the operation of the MAC layer processor of the mobile station of FIG. 3 in accordance with the embodiment of the present invention.

Referring to FIG. 8, operation of the MAC layer processor 348 in accordance with the embodiment of the present invention begins by determining if a signal has been received from the physical layer processor 346 indicating that a downlink frame has been received 802. When the signal indicating a downlink burst is received 802 from the physical layer processor 346, a cyclic redundancy check (CRC) verification is performed 804 to determine if an MPDU is correctly received. If the CRC is not correct 806, the MAC layer processor switches to the MPDU hunt mode 808 until a correct MPDU is received 810.

When a correct MPDU is received 806, 810 the MAC layer processor 348 in accordance with the embodiment of the present invention filters the connection identifier (CID) 812 to recover the CID and determine whether the MPDU is intended 814 for the mobile station 120 or whether the rest of the downlink burst is relevant 816 for the mobile station 120. If the CID indicates that the MPDU is intended 814 for the mobile station 120, the MAC layer processor 348 submits such MPDU to the next functional block within the MAC layer 818 and it is then determined whether the rest of the downlink burst is relevant 816 for the mobile station 120.

In accordance with the embodiment of the present invention, the rest of the downlink burst is relevant 816 to the mobile station 120 if the CID is not greater than a predetermined CID associated with the mobile station 120. As the MPDUs have been ordered within the downlink burst in accordance with ascending CIDs thereof, any MPDUs having CIDs greater than the highest CID relevant to the mobile station 120 would not be relevant to the mobile station 120. Thus, the highest relevant CID would be the predetermined CID and could be stored in the memory 330.

If, alternatively, the MPDUs have been ordered within the downlink burst in accordance with descending CIDs thereof, the lowest relevant CID would be the predetermined CID for comparison in step 816. In accordance with another aspect of the present invention, the MPDUs could be ordered in accordance with a nature of a connection (e.g., broadcast, transport) indicated by a CID and, within each nature of connection, in ascending or descending order of CIDs. By ordering the MPDUs with the nature of connection indicating relevancy for multiple mobile stations 120 before MPDUs with the nature of connection indicating relevancy for only a single mobile station 120, step 816 could advantageously determine, in response to a predetermined CID associated with the mobile station 120, a point at which all further MPDUs are not relevant to the mobile station 120, even if both broadcast and transport CIDs indicate MPDUs intended for the mobile station 120.

If further MPDUs are relevant 816 to the mobile station 120, the next MPDU is received 820 and processing returns to verify CRC 804. If the rest of the MPDUs in the downlink burst are not relevant 816, the MAC layer processor 348 signals the physical layer processor 346 to drop the rest of the downlink burst 822, thereby enabling advantageous power savings by the physical layer processor 346. The MAC layer processor 248 then ends downlink burst processing thereby 824, allowing the MAC layer processor to enter a power save mode until a next signal is received from the physical layer processor 346 that a downlink burst is received 802.

Thus it can be seen that a method and apparatus for the MAC layer processor 348 to predict which CIDs in a downlink frame are intended for the mobile station 120 has ben provided so that MPDUs unintended for the mobile station 120 need not be processed, thereby conserving power. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method of processing a downlink frame in a Medium Access Control (MAC) layer processor of a mobile station in a wireless communication system, the downlink frame comprising one or more downlink bursts, each of the one or more downlink bursts comprising a plurality of MAC layer protocol data units (MPDUs), each MPDU including a connection identifier (CID), wherein the CID is a number, the method comprising the steps of:

processing one of the plurality of MPDUs to recover the CID thereof;

determining whether to process a next one of the plurality of MPDUs of one of the one or more downlink bursts or whether to cease processing of the downlink burst in response to the CID of the one of the plurality of MPDUs being greater than the predetermined CID value; and providing information to a physical layer processor to not submit any more of the plurality of MPDUs to the MAC layer processor in response to the determining step determining to cease processing of the plurality of MPDUs.

2. The method in accordance with claim 1 wherein the CID is a number indicating a nature of a connection and wherein the determining step comprises the step of determining whether to process a next one of the one plurality of MPDUs of the one of the one or more downlink bursts in response to the CID of the one of the one or more MPDUs indicating a predetermined nature of a connection and being greater than or equal to the predetermined CID value.

3. The method in accordance with claim 2 wherein the nature of the connection includes one of a broadcast connection, a management connection, and a transport connection.

4. A method of processing a downlink frame within a Medium Access Control (MAC) layer processor of a mobile station in a wireless communication system, the downlink frame comprising one or more downlink bursts, each of the one or more downlink bursts comprising a plurality of MAC layer protocol data units (MPDUs), each MPDU including a connection identifier (CID), wherein the CID is a number, the method comprising the steps of:
  processing one of the plurality of MPDUs to recover the CID thereof;
  determining whether to process a next one of the plurality of MPDUs of one of the one or more downlink bursts or whether to cease processing of the downlink burst in response to the CID of the one of the plurality of MPDUs being less than or equal to the predetermined CID value; and
  providing information to a physical layer processor to not submit any more of the plurality of MPDUs to the MAC layer processor in response to the determining step determining to cease processing of the plurality of MPDUs.

5. An apparatus for processing a downlink frame comprising one or more downlink bursts, each of the one or more downlink bursts comprising a plurality of MAC layer protocol data units (MPDUs), the apparatus comprising:
  receiver circuitry receiving radio frequency (RF) signals and demodulating the RF signals to recover the downlink frame;
  a physical layer processor coupled to the receiver circuitry and processing the downlink frame to recover the plurality of MPDUs therefrom, each of the plurality of MPDUs including a connection identifier (CID), wherein the CID is a number; and
  a MAC layer processor coupled to the physical layer processor and receiving one of the plurality of MPDUs therefrom, the MAC layer processor processing the one of the plurality of MPDUs to recover the CID thereof and determining whether to process a next one of the plurality of MPDUs of one of the one or more downlink bursts or whether to cease processing of the downlink burst in response to the relationship between the CID of the one of the plurality of MPDUs and the predetermined CID value being such that the CID of the one of the plurality of MPDUs is greater than the predetermined CID value.

6. The apparatus in accordance with claim 5 wherein the CID is a number indicating a nature of a connection and wherein the MAC layer processor determines whether to process a next one of the plurality of MPDUs of one of the one or more downlink bursts in response to the CID of the one of the plurality of MPDUs indicating a predetermined nature of a connection and the relationship between the CID of the one of the one or more plurality of MPDUs being such that the CID of the one of the plurality of MPDUs is greater than the predetermined CID value.

7. The apparatus in accordance with claim 6 wherein the nature of the connection includes one of a broadcast connection, a management connection, and a transport connection.

8. The apparatus in accordance with claim 5 wherein the MAC layer processor provides information to the physical layer processor to not submit any more of the plurality of MPDUs to the MAC layer processor in response to determining to cease processing of the plurality of MPDUs.

9. An apparatus for processing a downlink frame comprising one or more downlink bursts, each of the one or more downlink bursts comprising a plurality of MAC layer protocol data units (MPDUs), the apparatus comprising:
  receiver circuitry receiving radio frequency (RF) signals and demodulating the RF signals to recover the downlink frame;
  a physical layer processor coupled to the receiver circuitry and processing the downlink frame to recover the plurality of MPDUs therefrom, each of the plurality of MPDUs including a connection identifier (CID), wherein the CID is a number; and
  a MAC layer processor coupled to the physical layer processor and receiving one of the plurality of MPDUs therefrom, the MAC layer processor processing the one of the plurality of MPDUs to recover the CID thereof and determining whether to process a next one of the plurality of MPDUs of one of the one or more downlink bursts or whether to cease processing of the downlink burst in response to the relationship between the CID of the one of the plurality of MPDUs and the predetermined CID value being such that the CID of the one of the plurality of MPDUs is less than or equal to the predetermined CID value.

10. The apparatus in accordance with claim 9 wherein the MAC layer processor provides information to the physical layer processor to not submit any more of the plurality of MPDUs to the MAC layer processor in response to determining to cease processing of the plurality of MPDUs.

* * * * *